(12) United States Patent
Murthy

(10) Patent No.: US 12,119,989 B2
(45) Date of Patent: Oct. 15, 2024

(54) SYSTEM AND METHOD FOR CONFIGURING NETWORK ELEMENTS IN A DESIGN NETWORK TOPOLOGY

(71) Applicant: Keysight Technologies, Inc., Santa Rosa, CA (US)

(72) Inventor: Vijay Anantha Murthy, Austin, TX (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/513,957

(22) Filed: Oct. 29, 2021

(65) Prior Publication Data

US 2023/0133057 A1    May 4, 2023

(51) Int. Cl.
*H04L 41/0816* (2022.01)
*G06N 3/04* (2023.01)
(Continued)

(52) U.S. Cl.
CPC .......... *H04L 41/0816* (2013.01); *G06N 3/04* (2013.01); *H04L 41/0866* (2013.01); *H04L 41/0886* (2013.01); *H04L 41/12* (2013.01)

(58) Field of Classification Search
CPC ............. H04L 41/0816; H04L 41/0866; H04L 41/0886; H04L 41/12; H04L 41/145;
(Continued)

(56) References Cited

U.S. PATENT DOCUMENTS 7,324,691 B2 * 1/2008 Li ................. G06V 30/422
382/181
8,134,935 B2 * 3/2012 Chambers ............... H04L 41/12
370/254

(Continued)

FOREIGN PATENT DOCUMENTS

KR    102256199 B1    5/2021
WO    2019177264 B1    9/2019

OTHER PUBLICATIONS

M. Kinney, M. Hadjimichael, M. Cotter and M. Carley-Spencer, "Using Image Processing for Architecture Extraction from Non-Standard Sources," 2021 IEEE Applied Imagery Pattern Recognition Workshop (AIPR), Washington, DC, USA, 2021, pp. 1-7, doi: 10.1109/AIPR52630.2021.9762186. (Year: 2021).*

(Continued)

*Primary Examiner* — Dhairya A Patel
*Assistant Examiner* — Alex H. Tran

(57) ABSTRACT

A method of configuring network elements in a design network topology includes receiving an image of the design network topology; attempting to retrieve design data from the received image corresponding to the design network topology; when the design data is retrieved, querying a topologies database using the design data to find a previously determined network topology that substantially matches the design network topology; when the design data is not retrieved, predicting a network topology using an unsupervised machine learning algorithm; identifying configurations for network elements in the matching network (Continued)

topology or in the predicted network topology in a configurations database; determining design configurations for the network elements of the design network topology from the identified configurations; translating the design configurations of the network elements to a standard format; and pushing the translated design configurations to actual network elements and/or virtual network elements corresponding to the network elements.

20 Claims, 3 Drawing Sheets

(51) Int. Cl.
  *H04L 41/08* (2022.01)
  *H04L 41/0866* (2022.01)
  *H04L 41/12* (2022.01)
(58) Field of Classification Search
  CPC .......... H04L 41/14; G06N 3/04; G06V 10/44; G06V 30/422; G06V 10/00; G06V 10/10; G06V 10/12; G06V 10/14; G06V 10/19; G06V 10/25; G06V 10/255; G06V 10/40; G06V 10/426; G06V 10/443; G06V 10/74; G06V 10/757; G06V 10/759; G06V 10/77; G06V 10/771; G06V 10/7715; G06V 10/772; G06V 10/778; G06V 10/7792; G06V 10/82; G06V 10/84; G06V 10/85; G06V 10/86; G06V 10/87; G06V 30/41; G06V 30/412; G06V 30/413; G06V 30/414; G06V 30/416; G06V 30/418; G06V 30/42; G06V 2201/02; G06V 2201/10; G06T 2207/10004
  See application file for complete search history.

(56) References Cited

U.S. PATENT DOCUMENTS

| | | | | |
|---|---|---|---|---|
| 8,984,025 | B1* | 3/2015 | Tanksale | G06F 11/1448 707/804 |
| 9,197,663 | B1* | 11/2015 | Gilbert | G06F 3/04817 |
| 9,280,839 | B2* | 3/2016 | Bowkett | G06V 30/422 |
| 10,262,228 | B2* | 4/2019 | Gujar | G06V 30/347 |
| 10,331,973 | B2* | 6/2019 | Wang | H04L 41/0893 |
| 10,402,642 | B2* | 9/2019 | Ta | G06T 11/001 |
| 10,817,266 | B2* | 10/2020 | Lodhia | G06V 30/422 |
| 10,999,369 | B2* | 5/2021 | Gawad | H04L 67/1095 |
| 11,210,562 | B2* | 12/2021 | Mustafi | G06F 18/2148 |
| 11,418,404 | B2* | 8/2022 | Strom | H04L 43/08 |
| 11,443,416 | B2* | 9/2022 | Liao | G06F 16/5854 |
| 11,589,083 | B2* | 2/2023 | Khavronin | H04N 21/231 |
| 11,625,871 | B2* | 4/2023 | Mirho | G06T 5/70 382/181 |
| 11,659,123 | B2* | 5/2023 | Chae | G06K 7/1447 358/3.28 |
| 11,663,761 | B2* | 5/2023 | Schaefer | G06V 30/142 382/103 |
| 2013/0305091 | A1* | 11/2013 | Stan | G06F 11/263 714/35 |
| 2014/0278273 | A1* | 9/2014 | Bowler | H04L 41/12 703/1 |
| 2014/0313216 | A1* | 10/2014 | Steingrimsson | G06V 30/32 345/589 |
| 2016/0234073 | A1* | 8/2016 | Maes | H04L 67/10 |
| 2018/0173688 | A1* | 6/2018 | Melinand | G06V 30/422 |
| 2019/0179946 | A1* | 6/2019 | Cui | G06F 16/9538 |
| 2020/0044940 | A1 | 2/2020 | Thomasson et al. | |
| 2020/0175211 | A1* | 6/2020 | Kang | G06F 30/23 |
| 2022/0114495 | A1* | 4/2022 | Nurvitadhi | G06F 9/5044 |
| 2022/0139073 | A1* | 5/2022 | Kim | G06V 10/82 382/155 |
| 2022/0279220 | A1* | 9/2022 | Khavronin | H04N 21/251 |
| 2022/0391632 | A1* | 12/2022 | Ren | G06F 18/21 |
| 2023/0394813 | A1* | 12/2023 | Satoh | H04N 25/745 |

OTHER PUBLICATIONS

English translation of KR102256199B1, 8 pgs.
English translation of WO2019177264A1, 18 pgs.

* cited by examiner

SYSTEM AND METHOD FOR CONFIGURING NETWORK ELEMENTS IN A DESIGN NETWORK TOPOLOGY

BACKGROUND

Network topologies give an overview of computer networks comprised of network elements and how they are interconnected. As businesses expand and their ability to communicate via computer networks becomes imperative, so does the need for building reliable networks including various network elements such as routers, switches, hubs, servers, storage devices, and the like. As the number of devices in the networks grow, so does the complexity of how these devices are interconnected. Ensuring reliable networks is a laborious task for the network engineers. The ability to build and maintain networks that allow communication instantaneously and reliably requires accurate depiction of the networks through network topology diagrams. These network topologies allow network engineers to quickly understand how each network element is connected and enables further expansion of their network, debug any issues and in some cases scale down the network as well. Since business needs are constantly changing, so do the networks that serve these businesses. As the networks change, the corresponding network topologies change, making it difficult to track the changes in topology and map them to an accurate configuration in each of the network elements of the network.

An efficient and easy way to achieve this would be to accurately depict the network topology with network topology diagrams. These network topology diagrams then can be converted into a computer readable format to generate the necessary computer network elements configuration then it would be much simpler to scale up or down a network and easily diagnose problems in an existing network. Any real-time change in topology will be immediately notified to the system and a corresponding configuration changes can be implemented to remedy the situation. Thus, a network topology diagram can act as a template for recreation of configurations of the network elements. If the topology diagram can be translated and stored in a computer readable format, then the necessary diagram and/or configuration may be generated accurately and repetitively without risking downtime in the network and affecting business needs.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
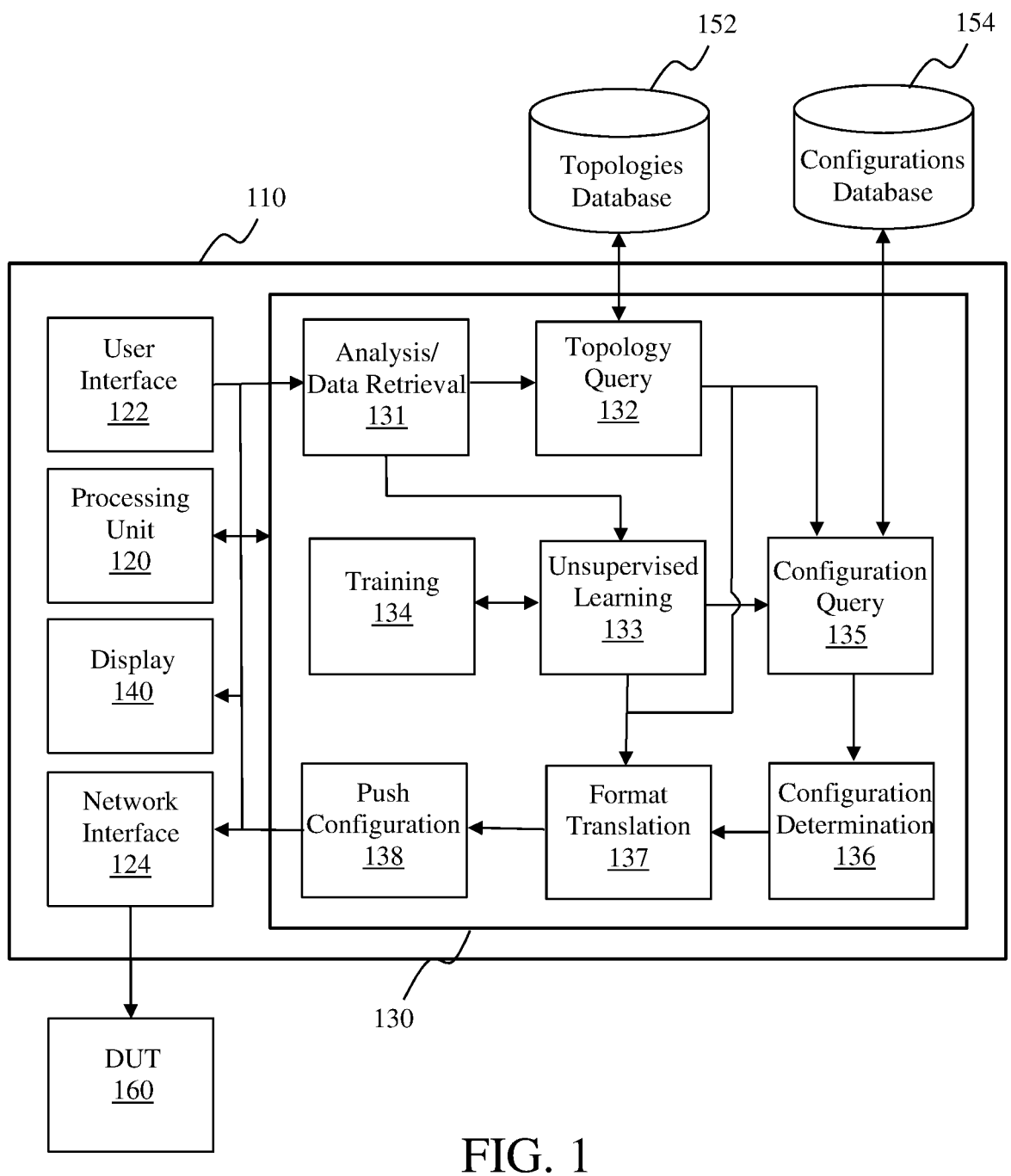
FIG. 1 is a simplified block diagram of a system for configuring network elements in a design network topology, according to a representative embodiment.

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

According to various embodiments, a network map of a network topology is reverse engineered and automatically converted into actual network and/or simulated configurations of network elements in a new design network topology. Generally, an image of the network topology with network elements is used to query a network topologies database to find previously determined network topologies that match network elements and interconnections as per the network topology. Design configurations of the network elements may then be derived from stored configurations of network elements of a matching network topology. The derived design configurations are translated to a standard format and are pushed to actual network elements in a hardware setup and are configured on provisioned virtual network elements in an emulated environment. The network topology is further converted into a standardized computer readable format, in order for it to be re-utilized to replicate similar such network topologies.

According to a representative embodiment, a system is provided for configuring network elements in a design network topology. The system includes a topologies database for storing previously determined network topologies; a configurations database for storing previously determined configurations of the network elements in the previously determined network topologies, respectively; a processing unit; and a non-transitory memory. The non-transitory memory stores instructions that, when executed by the processing unit, cause the processing unit to attempt to retrieve design data from the received image corresponding to the design network topology; when the design data is retrieved, query the topologies database using the design data to find a previously determined network topology that substantially matches the design network topology; when the design data is not retrieved, predict a network topology using an unsupervised machine learning algorithm; identify configurations for network elements in the matching network topology or in the predicted network topology in the configurations database; determine design configurations for the network elements of the design network topology from the identified configurations; translate the design configurations of the network elements to a standard format; and push the translated design configurations to at least one of actual network elements or virtual network elements corresponding to the network elements. The instructions may further cause the processing unit to store the translated design configurations of the network elements in the configurations database, as well as translate the matching network topology or the predicted network topology to a standard format; and store the translated network topology in the topologies database.

According to another representative embodiment, a method is provided for configuring network elements in a design network topology. The method includes receiving an image of a design network topology including network elements; attempting to retrieve design data from the received image corresponding to the design network topology; when the design data is retrieved, querying a topologies database, which stores previously determined network topologies, using the design data to find a previously determined network topology that substantially matches the design network topology; when the design data is not retrieved, predicting a network topology using an unsupervised machine learning algorithm; identifying configurations for network elements in the matching network topology or in the predicted network topology in a configurations database; determining design configurations for the network elements of the design network topology from the identified configurations; translating the design configurations of the network elements to a standard format; pushing the translated design configurations to at least one of actual network elements or virtual network elements corresponding to the network elements. and storing the translated design configurations of the network elements in the configurations database. The method may further include translating the matching network topology or the predicted network topology to a standard format; and storing the translated network topology in the topologies database.

According to another representative embodiment, a non-transitory computer readable medium stores instructions for configuring network elements in a design network topology. When executed by at least one processor, the instructions cause the at least one processor to receive an image of a design network topology including network elements; attempt to extract design data from the received image corresponding to the design network topology; when the design data is extracted, query a topologies database, which stores previously determined network topologies, using the design data to find a previously determined network topology that substantially matches the design network topology; when the design data is not extracted, predict a network topology using an unsupervised machine learning algorithm; identify configurations for network elements in the matching network topology or in the predicted network topology in a configurations database; optimize the identified configurations of the network elements; translate the optimized configurations of the network elements to a standard format; and push the translated design configurations to at least one of actual network elements or virtual network elements corresponding to the network elements.

FIG. 1 is a simplified block diagram illustrating a system for configuring network elements in a network topology, according to a representative embodiment.

Referring to FIG. 1, system 100 includes a workstation 110 for implementing and/or managing the processes described herein. The workstation 110 includes one or more processors indicated by processing unit 120, one or more memories indicated by memory 130, a user interface 122, a network interface 124, and a display 140.

The memory 130 stores instructions executable by the processing unit 120. When executed, the instructions cause the processing unit 120 to implement one or more processes for configuring actual network elements or virtual network elements according to a network topology provided by a user (e.g., design engineer). The network topology includes various network elements, which may be any type of compatible devices for implementing an IP network, for example, such as switches, routers, hubs and databases. The network elements and connections among them may be displayed on the display 140. The display 140 may include a graphical user interface (GUI) (not shown), which would include the user interface 122.

For purposes of illustration, the memory 130 is shown to include software modules, each of which includes the instructions corresponding to an associated capability of the system 100. Also, for purposes of illustration and to facilitate understanding of the embodiments described herein, the basic flow of the process is indicated by arrows connecting software modules in the memory 130, even though the execution of the software modules is controlled by the processing unit 120. It is understood that the software modules are not intended to place limitations on the actual arrangement or grouping of software instructions being executed by the processing unit 120 to provide the embodiments described herein.

The processing unit 120 is representative of one or more processing devices, and may be implemented by field programmable gate arrays (FPGAs), application specific integrated circuits (ASICs), a digital signal processor (DSP), a general purpose computer, a central processing unit, a computer processor, a microprocessor, a microcontroller, a state machine, programmable logic device, or combinations thereof, using any combination of hardware, software, firmware, hard-wired logic circuits, or combinations thereof. Any processing unit or processor herein may include multiple processors, parallel processors, or both. A processor may also refer to a collection of processors within a single computer system or distributed among multiple computer systems, such as in a cloud-based or other multi-site application. Programs have software instructions performed by one or multiple processors that may be within the same computing device or which may be distributed across multiple computing devices.

The memory 130 may include main memory and/or static memory, where such memories may communicate with each other and the processing unit 120 via one or more buses. The memory 130 may be implemented by any number, type and combination of random access memory (RAM) and read-only memory (ROM), for example, and may store various types of information, such as software algorithms, artificial intelligence (AI) machine learning algorithms (models), and computer programs, all of which are executable by the processing unit 120. The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, Blu-ray disk, a universal serial bus (USB) drive, or any other form of storage medium known in the art. The memory 130 is a tangible storage medium for storing data and executable software instructions and is non-transitory during the time software instructions are stored therein. The term non-transitory specifically disavows fleeting characteristics such as characteristics of a carrier wave or signal or other forms that exist only transitorily in any place at any time. The memory 130 may store software instructions and/or computer readable code that enable performance of various functions. The memory 130 may be secure and/or encrypted, or unsecure and/or unencrypted.

The processing unit 120 may include or have access to one or more artificial intelligence (AI) engines, which may be implemented as software and that provide artificial intelligence and apply machine learning algorithms described herein. The AI engine(s) may reside in any of various components in the processing unit 120 and the memory 130, as well as in an external server and/or the cloud, for example. When AI engine(s) are implemented in a cloud, such as at a data center, for example, the AI engine(s) may be connected to the processing unit 120 via the internet using one or more wired and/or wireless connection(s).

The system 100 also includes databases for storing information that may be used by the various software modules of the memory 130, including network topologies database 152 and configurations database 154. The network topologies database 152 stores previously determined network topologies, and the configurations database 154 stores previously determined configurations of the network elements in the previously determined network topologies, respectively. The databases may be implemented by any number, type and combination of RAM and ROM, for example, as discussed above with regard to the memory 130. The databases are tangible storage mediums for storing data and executable software instructions, and are non-transitory during the time data and software instructions are stored therein. The databases may be secure and/or encrypted, or unsecure and/or unencrypted. For purposes of illustration, the network topologies database 152 and the configurations database 154 are shown as separate databases, although it is understood that they may be combined, and/or included in the memory 130, without departing from the scope of the present teachings.

The user interface 122 receives input from the user to be provided to the processing unit 120 and/or the memory 130, and receives information and data output by the processing unit 120 and/or the memory 130. All or a portion of the user interface 122 may be implemented by a GUI viewable on the display 140, discussed above. The user interface 122 may one or more of a mouse, a keyboard, a trackball, a joystick, a microphone, a touchpad, a touchscreen (on the display 140), voice and/or gesture recognition captured by a microphone or video camera, for example.

The network interface 124 interfaces the workstation 110 with one or more actual or virtual network elements, represented by device under test (DUT) 160. The network interface 124 enables design configurations determined according to the embodiments described herein to be pushed to the DUT 160. The network interface 124 also enables communication between the workstation 110 and the DUT 160 for establishing and maintaining wired or wireless connections between them. The network interface 124 may be a physical interface, including one or more of ports, disk drives, wireless antennas, wired connectors, receivers, transmitters and firmware/software, for example, when the DUT 160 is embodied as one or more actual network elements. The network interface 124 may be a software interface or an application programming interface (API), for example, when the DUT 160 is embodied as one or more virtual network elements.

The display 140 may be a monitor such as a computer monitor, a television, a liquid crystal display (LCD), an organic light emitting diode (OLED), a flat panel display, a solid-state display, or a cathode ray tube (CRT) display, or an electronic whiteboard, for example. The display 140 includes a screen for viewing images of network topologies provided by the user, as well as a GUI (optional) to enable the user to interact with the displayed images and features.

Referring to the memory 130, analysis/data retrieval module 131 is configured to receive an image of a design network topology from the user via the user interface 122, and retrieve (extract) design data from the image. The network topology may be a manual design by the user or may be a partially or fully automated design provided by network design software, such as IxNetwork, available from Keysight Technologies, Inc., for example. A network topology is graphical representation of interconnected network elements such as switches, routers, hubs, servers, firewalls and/or databases to enable communication across a network through a commonly understood computer network language like Internet Protocol suite, for example, as would be apparent to one skilled in the art. The design network topology may be depicted physically or logically. The image of the design network topology is a visual representation of interconnected network elements, often referred to as a network topology diagram, a block diagram or a functional block diagram of the network elements in the design network topology, for example.

Figure 3:
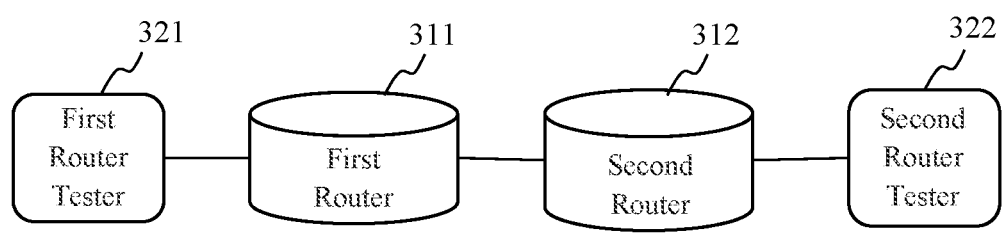
FIG. 3 is an example of a block diagram of a simple network topology that includes four network elements, for purpose of illustration.

The image of the design network topology may depict network elements as nodes and connections between the network elements as lines between the nodes. FIG. 3 is an example of a block diagram of a simple design network topology that includes four network elements. First router 311 and second router 312 are connected to one another, and first router tester 321 and second router tester 322 are connected to the first and second routers 311 and 312, respectively, for emulating real world traffic to test the first and second routers 311 and 312. The image may be provided in any compatible format, such as the native format of a graphics application, such as Microsoft Visio diagram or Keysight IxNetwork topology, or an imaging format, such as JPEG, PNG, TIF or GIF, for example.

Retrieval of the design data by the analysis/data retrieval module 131 depends on the format of the image depicting the network topology. For example, when the image of the network topology is provided by IxNetwork, the design data may be retrieved using a constellation-based model (e.g., computer vision based object identification model) for content retrieval based on object recognition in the computer vision field. The constellation-based model initially tries to match a given number of network elements that might have some symmetry with the user supplied design network topology. If the constellation-based data retrieval fails, a supervised machine learning algorithm, such as Graph Neural Network (GNN), for example, may be leveraged to retrieve the design data of the network elements from the image of the network topology. This supervised machine learning algorithm helps represent the given image as a combination of nodes and directed lines towards these nodes, which in turn helps associate the given network topology irrespective of the orientation of the image provided. If the supervised machine learning algorithm fails then an unsupervised machine learning algorithm, such as You-only-look-once version 3 (YOLOv3), for example, is deployed to help break down the image into grids, and try to provide a confidence score of its prediction, as discussed below with reference to unsupervised machine learning module 133. The unsupervised machine learning algorithm predicts quickly and accurately the design network topology.

Topology query module 132 is configured to receive the design data from the analysis/data retrieval module 131, and to query the network topologies database 152 using a search query derived from the extracted design data to determine whether the network topology substantially matches any of the previously determined network topologies stored in the network topologies database 152. That is, the search query may be formed based on the number, types and interconnectivity of the various network elements, for example, provided by the design data. "Substantially matches" means that basic design concepts of the network topology are the same as corresponding design concepts of a previously determined network topology, while specific details of the implementation, such as the type of physical and logical connection to the interconnected nodes may vary. However, a substantial match includes an exact match for the numbers of nodes in the network and the number of interconnections between two nodes across all network elements in the network topology diagram including a highly accurate prediction of the probable internet protocol software to be executed on each of the network elements. That is, matching determinations are made based on the overall design of the network topology compared to matching network topologies in the network topology database.

When the constellation-based model and the supervised learning algorithm fail, the analysis/data retrieval module 131 uses the unsupervised learning algorithm, e.g., YOLOv3, to predict the network topology, as discussed above. In this case, the topology query module 132 is not needed to find a matching previously determined network topology stored in the network topologies database 152, since the predicted network topology is applied. Rather, unsupervised machine learning module 133 iteratively predicts the network topology, using the confidence score of the previous prediction. Based on the final prediction of the network topology, the configurations are queried in the configurations database 154 to retrieve configurations of the network elements in the predicted network topology.

Training module 134 is configured to train the unsupervised machine learning algorithm based on the accuracy of the predicted network topology. Alternatively, the user may manually determine whether the network topology is accurate. In any case, when the network topology is accurate, the unsupervised machine learning algorithm is trained with design configurations of the network elements in the predicted network topology, and when the design configurations are not accurate, at least one error in the design configurations is identified and the unsupervised machine learning algorithm is trained using regression methodologies to improve the unsupervised machine learning algorithm. As this process of iterations and training continues, the accuracy of the predictions increases, and the unsupervised machine learning algorithm accurately determines the network topology provided by the user.

Configuration query module 135 is configured to receive the matching network topology from the topology query module 132 or the predicted network topology from the unsupervised machine learning module 133, and to query the configurations database 154 to retrieve configurations of network elements in the matching or predicted network topology using the matching or predicted network topology. The configuration query module 135 retrieves the stored configurations for the network elements from the configurations database 154. The retrieved configurations are to be used in implementing the design network topology.

Configuration determination module 136 is configured to receive the design data from the analysis/data retrieval module 131 and the configurations for the network elements from the configuration query module 135, and to determine design configurations for the network elements in the design network topology. The design configurations may include details for implementing the network elements, such as identifying a virtual local area network (VLAN), a network protocol, IP addressing, and IP routing protocols, such as Open Shortest Path First (OSPF) and Border Gateway Protocol (BGP), for example.

Determining the design configurations for the network elements may include optimizing the configurations of the network elements retrieved from the configurations database 154. Optimizing the configurations may include applying the design data to the configurations for the network elements. Initially, the configurations database 154 is queried to match the software protocol suite (e.g., internet protocol) of the design data and the configurations to be executed which may have been determined in previous iterations. The matched protocol suite is utilized as the configurations that will be provisioned on respective network elements in the topology. All or part of the processes provided by the configuration determination module 136 may be implemented by an AI engine, for example.

IxNetwork, IxLoad and IxChariot available from Keysight Technologies, Inc., provide software tools to develop simulations of various hyper-converged infrastructure network topologies. The network topology simulations can be utilized to create various datasets for continuous measurement and training for both the supervised and unsupervised machine learning algorithms. Due to the availability of unique and extensive samples of datasets, the machine learning algorithms through a combination of node/edge classification, regression and link prediction methodologies can train the machine learning algorithms to reliably and accurately generate a substantial match every time.

Format translation module 137 is configured to translate the design configurations and the network topology into standard formats, such as JavaScript Object Notation (JSON) format and/or Yet Another Markup Language (YAML) format, for computer readability. Using JSON and/or YAML formats makes it easy for a person having ordinary skill in the art to read and understand. The JSON and/or YAML formatted design configurations may be stored in the configurations database 154 and the JSON and/or YAML formatted network topology may be stored in the topologies database 152. In addition, the JSON and/or YAML formatted design configurations are pushed to network elements through push configuration module 138, discussed below.

More particularly, the format translation module 137 receives the determined design configurations for the network elements from the configuration determination module 136, and translates the received design configurations to a standard format, such as JSON and/or YAML formats, both of which are standard text-based formats. The JSON and/or YAML formatted configurations are organized in text files in a hierarchical fashion relating to the network topology, making it relatively simple to locate and diagnose any issues in the configuration for each network element. The design configurations are stored in the configurations database 154 in the JSON and/or YAML formats to be available for subsequent network element configuration searches. As mentioned above, the design configurations may include details for implementing the network elements, such as identifying a VLAN, a network protocol, IP addressing, and IP routing protocols (e.g., OSPF and BGP), for example, which information is stored in the JSON and/or YAML formats. Notably, if future network configurations include changes, the JSON and/or YAML files are changed accordingly and the network configuration can be changed by simple push configuration to the respective network elements.

The format translation module 137 also receives the network topology including the network elements from the topology query module 132 and/or the unsupervised machine learning module 133, and translates the network topology into text based JSON and/or YAML files. These JSON and/or YAML files indicate the network elements as nodes and the interconnectivity of all the network elements, as well as respective configurations protocol software suite, as key value pairs, thus describing for each network element the number of physical connections and links with other network elements. For example, referring to the illustrative network topology in FIG. 3, the JSON and/or YAML files describe the physical connections and links between the first router 311 and the first router tester 321, between the first router 311 and the second router 312, and between second router 312 and the second router tester 322. The JSON and/or YAML files are stored in one or more databases, including the network topologies database 152, as discussed above. This enables a one to one translation of each network topology diagram to a computer readable format in JSON and/or YAML files, and subsequent reverse engineering to build the network topology for future replication and maintenance of networks.

Push configuration module 138 is configured to receive the translated design configurations from the format translation module 137, and to push the translated design configurations to the DUT 160 via the network interface 124. As described above, the DUT 160 may be representative of one or more physical network elements in a physical network actually implemented according to the design network topology. Or, the DUT may be representative of one or more virtual network elements in a virtual network simulated by known simulation software according to the network topology. The physical and/or virtual network elements are then configured in the network topology, which may be used for network performance or proof-of-concept lab network design and concept testing, for example. Examples of network simulation software include IxNetwork, IxLoad, IxChariot, HawkEye available from Keysight Technologies, Inc., for example.

The translated design configurations are not necessarily pushed to all of the actual or virtual network elements, depending on the specifics of the design network topologies. Rather, when multiple network elements have the same design configuration, the translated design configuration for those network elements may pushed to only one actual (or virtual) network element in the group, and then the one actual (or virtual) network element shares the translated design configuration with the other actual (or virtual) network elements having the same configuration. Also, during testing, a smaller number of network elements may be desirable to avoid too many variables, and the outputs are deterministic.

Figure 2:
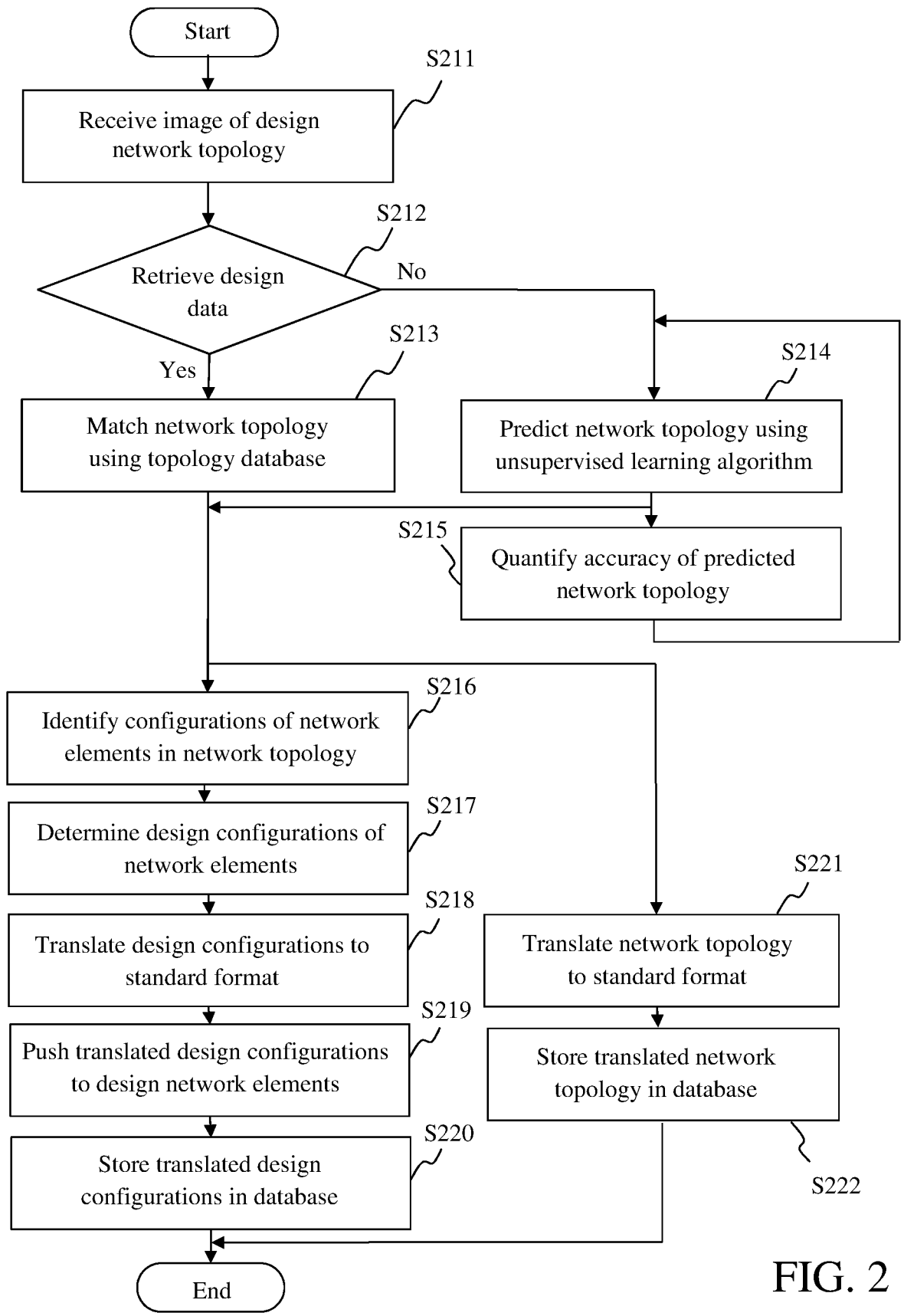
FIG. 2 is a flow diagram of a method for configuring network elements in a design network topology, according to a representative embodiment.

FIG. 2 is a simplified flow diagram illustrating a method of configuring network elements in a design network topology, according to a representative embodiment. The method may be implemented using a computer, such as workstation 110, for example, discussed above with reference to FIG. 1, where the method steps are provided as instructions stored in the memory 130 and executable by the processing unit 120.

Referring to FIG. 2, the method includes receiving an image of a design network topology in block S211. The design network topology may provide the structural and logical arrangement of one or more network elements in an IP network, for example. The network elements may be depicted as nodes and connections between the network elements may be depicted as lines between these of nodes, for example. The image may be provided as a Visio, IxNetwork or other graphics application formatted diagram, or as a JPEG, PNG, TIF, GIF or other imaging formatted image, for example.

In block S212, it is determined whether design data may be retrieved or otherwise extracted from the received image, where the design data correspond to the design network topology. As discussed above, the design data may be retrieved from the image using computer vision or AI based segmentation techniques, or using IxNetwork content retrieval techniques, for example. For example, IxNetwork uses a constellation-based model for content retrieval of the design data based on object recognition in computer vision field. If the constellation-based data retrieval fails, a supervised machine learning algorithm (e.g., GNN) may be leveraged to retrieve the design data.

When the design data can be retrieved or extracted from the image (block S212: Yes), a network topology database (e.g., network topologies database 152) is queried in block S213 to find a previously determined network topology that substantially matches the design network topology. For example, the matching determination may be made by building a query based on the design data, and searching the previously determined network topologies in the network topology database using the query. Alternatively, when the design network topology, as well as the previously determined network topologies in the network topology database, are designed using IxNetwork, for example, the matching determination may be made by comparing aspects of the design data with corresponding aspects of the like formatted previously determined network topologies, as discussed above.

When the design data cannot be retrieved or extracted from the image (block S212: No), e.g., meaning that both the constellation-based data retrieval and the supervised machine learning algorithm have failed, an unsupervised machine learning algorithm (e.g., YOLOv3) is deployed to predict the design network topology shown in the received image in block S214. Predicting the design network topology is an iterative process that includes quantifying in block S215 the accuracies of the intermediate network topologies, and providing corresponding confidence scores for the predictions. The unsupervised machine learning algorithm is trained based on the quantified accuracies by repeating the prediction in block S214 until a desired confidence score is attained.

In block S216, configurations are identified for network elements in the matching network topology from block S213 or the predicted network topology from block S214. Identifying the configurations for the network elements may include querying a configurations database (e.g., configurations database 154) that stores previously determined network element configurations corresponding to the previously determined network topologies, respectively. The network configurations database may be queried using information regarding the matching or predicted network topology.

In block S217, design configurations for the network elements in the design network topology are determined from the configurations for the network elements identified in block S216. The design configurations include details for implementing the network elements, such as identifying a VLAN, a network protocol, IP addressing, and IP routing protocols such as OSPF and BGP, for example. Determining the design configurations for the network elements may include optimizing the configurations of the network elements from the configurations database. Optimizing the configurations may be done by applying the design data and the design configurations to the configurations database, matching the software protocol suite of the design data and the design configurations to be executed, utilizing the matched protocol suite as the key to query the configurations database to match similar configuration to be used to implement the network elements.

In block S218, the design configurations of the network elements are translated to a standard format, such as JSON format and/or YAML format, for example, for computer readability. In block S219, the translated design configurations in the standard format are pushed to one or more physical network elements respectively corresponding to the design network elements, or to one or more virtual (computer simulated) network elements respectively corresponding to the network elements. The actual and/or virtual network elements are then configured for actual or simulated implementation of the design network topology, which be used for actual network performance and/or design and concept testing.

In block S220, the translated design configurations in the standard format are stored in the configurations database that was searched as discussed above with reference to block S216. Thus, the configurations databases will include additional configuration information available for the next configurations search for another design network topology.

In addition, in block S221, the network topology is translated to a standard format, such as JSON format and/or YAML format, for example. The network topology is either the matching network topology retrieved from the topologies database in block S213 or the predicted network topology determined in block S214. In block S222, the translated network topology in the standard format is stored in the topologies database that was searched as discussed above with reference to block S213. Thus, the network topologies database will include an additional network topology available for the next design network topology search.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those having ordinary skill in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

Aspects of the present invention may be embodied as an apparatus, method or computer program product. Accordingly, aspects of the present invention may take the form of an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:

1. A system for configuring network elements in a design network topology, the system comprising:
   a topologies database for storing a plurality of previously determined network topologies;
   a configurations database for storing previously determined configurations of the network elements in the previously determined network topologies, respectively;
   a processing unit; and
   a non-transitory memory for storing instructions that, when executed by the processing unit, cause the processing unit to:
      receive an image of a design network topology comprising a plurality of network elements, wherein the design network topology provides at least one of structural or logical arrangements of the plurality of network elements in a communication network;

attempt to retrieve design data from the received image corresponding to the design network topology using a constellation-based model and using a supervised machine learning algorithm when the design data cannot be retrieved using the constellation-based model, depending on a format of the received image;

when the design data can be retrieved, query the topologies database using the design data to find a previously determined network topology that substantially matches the design network topology, and identify configurations for network elements in the matching network topology in the configurations database;

when the design data cannot be retrieved, predict a network topology using an unsupervised machine learning algorithm, and identify configurations for network elements in the predicted network topology in the configurations database;

determine design configurations for the network elements of the design network topology from the identified configurations;

translate the design configurations of the network elements to a standard format; and push the translated design configurations to at least one of actual network elements or virtual network elements corresponding to the network elements.

2. The system of claim 1, wherein the instructions further cause the processing unit to:
store the translated design configurations of the network elements in the configurations database.

3. The system of claim 1, wherein the instructions further cause the processing unit to:
translate the matching network topology or the predicted network topology to a standard format; and
store the translated network topology in the topologies database.

4. The system of claim 1, wherein the standard format comprises JavaScript Object Notation (JSON) format and/or Yet Another Markup Language (YAML) format.

5. The system of claim 1, wherein the received image of the design network topology comprises one of a JPEG, PNG, TIF or GIF image, or a Visio diagram.

6. The system of claim 1, wherein the instructions further cause the processing unit to:
train the unsupervised machine learning algorithm by iteratively quantifying accuracies of intermediate predicted network topologies until attaining a desired confidence score for the predicted network topology.

7. The system of claim 1, wherein the instructions further cause the processing unit to determine the design configurations for the network elements by optimizing the identified configurations of the network elements to provide the design configurations for the network elements.

8. The system of claim 1, wherein the supervised machine learning algorithm comprises a Graph Neural Network (GNN) algorithm, and the unsupervised machine learning algorithm comprises a You-only-look-once version 3 (YOLOv3) algorithm.

9. A method of configuring network elements in a design network topology, the method comprising:
receiving an image of a design network topology comprising a plurality of network elements, wherein the design network topology provides at least one of structural or logical arrangements of the plurality of network elements in a communication network;

attempt to retrieve design data from the received image corresponding to the design network topology using a constellation-based model and using a supervised machine learning algorithm when the design data cannot be retrieved using the constellation-based model, depending on a format of the received image;

when the design data can be retrieved, querying a topologies database, which stores a plurality of previously determined network topologies, using the design data to find a previously determined network topology that substantially matches the design network topology, and identifying configurations for network elements in the matching network topology in a configurations database;

when the design data cannot be retrieved, predicting a network topology using an unsupervised machine learning algorithm, and identifying configurations for network elements in the predicted network topology in the configurations database;

determining design configurations for the network elements of the design network topology from the identified configurations;

translating the design configurations of the network elements to a standard format; and pushing the translated design configurations to at least one of actual network elements or virtual network elements corresponding to the network elements.

10. The method of claim 9, further comprising:
storing the translated design configurations of the network elements in the configurations database.

11. The method of claim 10, further comprising:
translating the matching network topology or the predicted network topology to a standard format; and
storing the translated network topology in the topologies database.

12. The method of claim 9, further comprising:
training the unsupervised machine learning algorithm by iteratively quantifying accuracies of intermediate predicted network topologies until attaining a desired confidence score for the predicted network topology.

13. The method of claim 9, wherein identifying the configurations for network elements in the matching network topology or in the predicted network topology comprises querying the configurations database, which stores network element configurations respectively corresponding to the plurality of previously determined network topologies, using the matching network topology or the predicted network topology to identify stored configurations of network elements.

14. The method of claim 9, wherein determining the design configurations for the network elements comprises optimizing the identified configurations of the network elements to provide the design configurations for the network elements.

15. A non-transitory computer readable medium storing instructions for configuring network elements in a design network topology, that when executed by at least one processor, cause the at least one processor to:
receive an image of a design network topology comprising a plurality of network elements, wherein the design network topology provides at least one of structural or logical arrangements of the plurality of network elements in a communication network;

attempt to retrieve design data from the received image corresponding to the design network topology using a constellation-based model and using a supervised machine learning algorithm when the design data cannot be retrieved using the constellation-based model, depending on a format of the received image;

when the design data can be extracted, query a topologies database, which stores a plurality of previously determined network topologies, using the design data to find a previously determined network topology that substantially matches the design network topology, and identify configurations for network elements in the matching network topology in a configurations database;

when the design data cannot be extracted from the received image, predict a network topology using an unsupervised machine learning algorithm, identify configurations for network elements in the predicted network topology in the configurations database;

optimize the identified configurations of the network elements;

translate the optimized configurations of the network elements to a standard format; and push the translated optimized configurations to at least one of actual network elements or virtual network elements corresponding to the network elements.

16. The non-transitory computer readable medium of claim 15, wherein the instructions further cause the at least one processor to:
store the translated optimized configurations of the network elements in the configurations database.

17. The non-transitory computer readable medium of claim 15, wherein the instructions further cause the at least one processor to:
translate the matching network topology or the predicted network topology to a standard format; and
store the translated network topology in the topologies database.

18. The non-transitory computer readable medium of claim 15, wherein the standard format comprises JavaScript Object Notation (JSON) format and/or Yet Another Markup Language (YAML) format.

19. The non-transitory computer readable medium of claim 15, wherein the received image of the design network topology comprises one of a JPEG, PNG, TIF or GIF image, or a Visio diagram.

20. The non-transitory computer readable medium of claim 15, wherein the instructions further cause the at least one processor to:
train the unsupervised machine learning algorithm by iteratively quantifying accuracies of intermediate predicted network topologies until attaining a desired confidence score for the predicted network topology.

* * * * *